(12) United States Patent
Awais

(10) Patent No.: US 7,460,480 B2
(45) Date of Patent: Dec. 2, 2008

(54) DYNAMICALLY ADAPTING THE TRANSMISSION RATE OF PACKETS IN REAL-TIME VOIP COMMUNICATIONS TO THE AVAILABLE BANDWIDTH

(75) Inventor: Ali Awais, Santa Clara, CA (US)

(73) Assignee: i2Telecom International, Inc., Roswell, GA (US)

( * ) Notice: Subject to any disclaimer, the term of this patent is extended or adjusted under 35 U.S.C. 154(b) by 679 days.

(21) Appl. No.: 11/078,059

(22) Filed: Mar. 11, 2005

(65) Prior Publication Data

US 2005/0201414 A1  Sep. 15, 2005

Related U.S. Application Data

(60) Provisional application No. 60/552,359, filed on Mar. 11, 2004.

(51) Int. Cl.
 *H04L 7/04* (2006.01)
(52) U.S. Cl. .................. 370/236; 709/230; 709/231; 704/200; 370/252; 370/235
(58) Field of Classification Search ................ 370/235, 370/236, 252, 352–356, 400–401, 465–467; 379/93.01, 93.08
 See application file for complete search history.

(56) References Cited

U.S. PATENT DOCUMENTS

| 5,402,481 | A | | 3/1995 | Waldman |
| 5,809,128 | A | | 9/1998 | McMullin |
| 5,987,103 | A | | 11/1999 | Martino |
| 6,014,440 | A | * | 1/2000 | Melkild et al. ............... 379/269 |
| 6,091,732 | A | | 7/2000 | Alexander, Jr. et al. |
| 6,104,757 | A | * | 8/2000 | Rhee ..................... 375/240.12 |
| 6,118,768 | A | | 9/2000 | Bhatia et al. |
| 6,125,113 | A | | 9/2000 | Farris et al. |
| 6,141,345 | A | | 10/2000 | Goeddel et al. |
| 6,185,288 | B1 | | 2/2001 | Wong |
| 6,256,778 | B1 | | 7/2001 | Oliver |
| 6,307,853 | B1 | | 10/2001 | Storch et al. |

(Continued)

OTHER PUBLICATIONS

U.S. Appl. No. 10/969,516, entitled "Portable VoIP Service Access Module," filed on Oct. 20, 2004, by Barkley et al.

(Continued)

*Primary Examiner*—Aung S Moe
*Assistant Examiner*—Curtis A Alia
(74) *Attorney, Agent, or Firm*—Toler Law Group

(57) ABSTRACT

A system and method for dynamically adapting the transmission rate of packets in real-time voice over IP communications to the available bandwidth. A real-time bandwidth monitor (RTBM) for VoIP applications senses the call path bandwidth between two endpoints of a VoIP communication and adapts in real-time the packet transmission rate to utilize that bandwidth. If sufficient bandwidth is available, the RTBM selects a low compression, low latency CODEC to offer best possible voice quality to the user. If the bandwidth is constrained, the RTBM degrades gracefully by switching to a high compression CODEC. On further bandwidth reduction, the RTBM increases the media frames per packet. Because the bandwidth reduction may be transitory, the RTBM constantly monitors the end-to-end available bandwidth so as to invoke the CODEC/frame per packet combination that provides the best quality of service (QoS) achievable over the current end-to-end available bandwidth.

4 Claims, 3 Drawing Sheets

U.S. PATENT DOCUMENTS

| | | | |
|---|---|---|---|
| 6,351,464 | B1 | 2/2002 | Galvin et al. |
| 6,359,880 | B1 | 3/2002 | Curry et al. |
| 6,389,005 | B1 | 5/2002 | Cruickshank |
| 6,389,038 | B1* | 5/2002 | Goldberg et al. ............. 370/471 |
| 6,434,139 | B1 | 8/2002 | Liu et al. |
| 6,445,694 | B1 | 9/2002 | Swartz |
| 6,449,251 | B1 | 9/2002 | Awadallah et al. |
| 6,496,477 | B1* | 12/2002 | Perkins et al. .............. 370/228 |
| 6,542,497 | B1 | 4/2003 | Curry et al. |
| 6,597,686 | B1 | 7/2003 | Smyk |
| 6,603,774 | B1* | 8/2003 | Knappe et al. .............. 370/466 |
| 6,618,761 | B2 | 9/2003 | Munger et al. |
| 6,636,504 | B1 | 10/2003 | Albers et al. |
| 6,658,496 | B1 | 12/2003 | Minakata et al. |
| 6,700,956 | B2 | 3/2004 | Chang et al. |
| 6,760,324 | B1 | 7/2004 | Scott et al. |
| 6,763,226 | B1 | 7/2004 | McZeal, Jr. |
| 6,771,594 | B1* | 8/2004 | Upadrasta ................... 370/228 |
| 6,788,769 | B1 | 9/2004 | Waites |
| 6,795,540 | B1 | 9/2004 | Mow |
| 6,822,957 | B1 | 11/2004 | Schuster et al. |
| 6,826,174 | B1* | 11/2004 | Erekson et al. ............. 370/352 |
| 6,856,612 | B1* | 2/2005 | Bjelland et al. ............. 370/338 |
| 6,895,000 | B2 | 5/2005 | Lai et al. |
| 6,907,031 | B1 | 6/2005 | Ehlinger et al. |
| 6,947,417 | B2 | 9/2005 | Laursen et al. |
| 6,954,454 | B1 | 10/2005 | Schuster et al. |
| 7,012,888 | B2 | 3/2006 | Schoeneberger et al. |
| 7,016,481 | B2 | 3/2006 | McElvaney |
| 7,046,683 | B1* | 5/2006 | Zhao .......................... 370/401 |
| 7,092,380 | B1 | 8/2006 | Chen et al. |
| 7,113,500 | B1 | 9/2006 | Bollinger et al. |
| 7,145,900 | B2 | 12/2006 | Nix et al. |
| 7,212,622 | B2 | 5/2007 | Delaney et al. |
| 7,213,766 | B2 | 5/2007 | Ryan et al. |
| 7,283,542 | B2 | 10/2007 | Mitchell |
| 7,302,053 | B2* | 11/2007 | Chang et al. ........... 379/220.01 |
| 2001/0038033 | A1 | 11/2001 | Habib |
| 2002/0007273 | A1* | 1/2002 | Chen ......................... 704/229 |
| 2002/0052965 | A1 | 5/2002 | Dowling |
| 2002/0097843 | A1 | 7/2002 | Krol et al. |
| 2002/0131604 | A1 | 9/2002 | Amine |
| 2002/0147912 | A1 | 10/2002 | Shmueli et al. |
| 2002/0184376 | A1 | 12/2002 | Sternagle |
| 2002/0191621 | A1 | 12/2002 | Jha |
| 2002/0191768 | A1 | 12/2002 | Stoughton |
| 2003/0002479 | A1 | 1/2003 | Vortman et al. |
| 2003/0012137 | A1* | 1/2003 | Abdelilah et al. ........... 370/229 |
| 2003/0023669 | A1 | 1/2003 | DeLima et al. |
| 2003/0093606 | A1 | 5/2003 | Mambakkam et al. |
| 2003/0110257 | A1 | 6/2003 | Hyun et al. |
| 2003/0112820 | A1 | 6/2003 | Beach |
| 2003/0123388 | A1 | 7/2003 | Bradd |
| 2003/0135376 | A1* | 7/2003 | Harada ....................... 704/275 |
| 2003/0161453 | A1 | 8/2003 | Veschi |
| 2003/0204619 | A1 | 10/2003 | Bays |
| 2003/0214939 | A1 | 11/2003 | Eldumiati et al. |
| 2003/0219006 | A1* | 11/2003 | Har ............................ 370/352 |
| 2003/0224780 | A1* | 12/2003 | Rodman et al. .......... 455/426.1 |
| 2004/0019539 | A1 | 1/2004 | Raman et al. |
| 2004/0032860 | A1* | 2/2004 | Mundra et al. .............. 370/352 |
| 2004/0032862 | A1 | 2/2004 | Schoeneberger et al. |
| 2004/0047451 | A1 | 3/2004 | Barker et al. |
| 2004/0086093 | A1 | 5/2004 | Schranz |
| 2004/0114581 | A1 | 6/2004 | Hans et al. |
| 2004/0133668 | A1 | 7/2004 | Nicholas, III |
| 2004/0141508 | A1 | 7/2004 | Schoeneberger et al. |
| 2004/0141758 | A1 | 7/2004 | El-Reedy |
| 2004/0165578 | A1 | 8/2004 | Burritt et al. |
| 2004/0205023 | A1 | 10/2004 | Hafer et al. |
| 2004/0205777 | A1 | 10/2004 | Zalenski et al. |
| 2004/0218583 | A1 | 11/2004 | Adan et al. |
| 2004/0223458 | A1 | 11/2004 | Gentie |
| 2004/0248590 | A1 | 12/2004 | Chan et al. |
| 2004/0258003 | A1 | 12/2004 | Kokot et al. |
| 2005/0002506 | A1 | 1/2005 | Bender et al. |
| 2005/0074031 | A1 | 4/2005 | Sunstrum |
| 2005/0074122 | A1 | 4/2005 | Fascenda |
| 2005/0089052 | A1 | 4/2005 | Chen et al. |
| 2005/0091392 | A1* | 4/2005 | Gesswein et al. ........... 709/231 |
| 2005/0094621 | A1 | 5/2005 | Acharya et al. |
| 2005/0138183 | A1 | 6/2005 | O'Rourke et al. |
| 2005/0180464 | A1 | 8/2005 | McConnell et al. |
| 2005/0195799 | A1 | 9/2005 | Burne et al. |
| 2005/0220083 | A1 | 10/2005 | Takeuchi |
| 2005/0243733 | A1 | 11/2005 | Crawford et al. |
| 2006/0008059 | A1 | 1/2006 | Ying et al. |
| 2006/0029062 | A1 | 2/2006 | Rao et al. |
| 2006/0029063 | A1 | 2/2006 | Rao et al. |
| 2006/0031393 | A1 | 2/2006 | Cooney et al. |
| 2006/0034296 | A1 | 2/2006 | Talucci |
| 2006/0037071 | A1 | 2/2006 | Rao et al. |
| 2006/0039356 | A1 | 2/2006 | Rao et al. |
| 2006/0088025 | A1 | 4/2006 | Barkley et al. |
| 2006/0208066 | A1 | 9/2006 | Finn et al. |
| 2006/0276230 | A1 | 12/2006 | McConnell |
| 2007/0248081 | A1 | 10/2007 | Barkley et al. |
| 2008/0025291 | A1 | 1/2008 | Barkley et al. |

OTHER PUBLICATIONS

"Pocki Phone VoIP Softphone + USB Flash Disk Drive (128M)", www.welltech.com/newsletter/vol_5/20041005.htm, Oct. 5, 2004, 2 pages.

Rosenberg, J. et al., "SIP: Session Initiation Protocol," RFC 3261, Jun. 2002, pp. 1-18.

Rosenberg, J. et al. "STUN—Simple Traversal of User Datagram Protocol (UDP) Through Network Address Translators (NATS)," RFC 3489, Mar. 2003, pp. 1-47.

Schulzrinne, H. "Dynamic Host Configuration Protocol (DHCP-for-IPv4) Option for Session Initiation Protocol (SIP) Servers," RFC 3361, Aug. 2002, pp. 1-7.

Camarillo, G. et al. "Integration of Resource Mangement and Session Initiation Protocol (SIP)," RFC 3312, Oct. 2002, pp. 1-30.

"EcoCarrier-carrier, long distance, call, VoIP, ITSP, service", www.ecocarrier.com, printed Jun. 13, 2005, pp. 1-3.

"EcoPhone + VoIP!Phone Q-Fone-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2005, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder=SkypeCasters", linuxathome.com, Dec. 29, 2004, pp. 1-4.

"CommGenie VoIP Suite", www.nexge.com, printed Jun. 1, 2005, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

Douglas F. Bender, U.S. Appl. No. 12/098,947, entitled "Systems and Methods of Making a Call," filed on Apr. 7, 2008, 32 pages.

\* cited by examiner

Banwidth Usage G.723.1 codec with IP packet overhead on Ethernet

DYNAMICALLY ADAPTING THE TRANSMISSION RATE OF PACKETS IN REAL-TIME VOIP COMMUNICATIONS TO THE AVAILABLE BANDWIDTH

CROSS REFERENCE TO RELATED APPLICATIONS

This application claims priority under 35 U.S.C. § 119(e) from provisional application No. 60/552,359 filed Mar. 11, 2004. The 60/552,359 application is incorporated by reference herein, in its entirety, for all purposes.

BACKGROUND

The present invention relates generally to the field of Voice-Over-Internet-Protocol (VoIP). More particularly, the present invention provides means for adapting the bandwidth requirement of a real-time voice-communication to the available bandwidth of the underlying transport network.

In traditional circuit switched telephony, a continuous data "pipe" is provided through the Public Switched Telephone Network (PSTN) to guarantee the flow of the PCM voice data. Internet telephony on the other hand must overcome a variety of impairments to the regular and timely delivery of voice data packets to the far end. These impairments are inherent in current Internet architecture, which provides a best-effort delivery service without any guarantees regarding the delivery of voice packets. Additionally, the transport of the voice packets is constrained by the amount of bandwidth available in the network connection, the delay that the packet experiences and any packet loss or corruption that occurs. In general, the measure of the quality of a data network to transport voice data packets quickly and consistently is referred to as the network's quality of Service (QoS).

A variety of network conditions affect the QoS of a connection. The bandwidth (BW) is the measure of the number of bits per second that can flow through a network link at a given time. Available bandwidth is limited by both the inherent capacity of the underlying network as well as other traffic along that route. End-to-End bandwidth from sender to receiver (the "call path") will be determined by the slowest link on the entire route. For example, a dialup connection to the ISP with and ideal bandwidth of 56 kilobits per second (kb/s) may be the slowest link for a user. However, the bandwidth actually available to a VoIP application on this link at a particular time will be lower if a larger file transfer is taking place at that time.

The bandwidth usage per channel is determined primarily by the compressor/decompressor (CODEC) used to digitize and compress voice data and its associated overhead. Table 1 lists the one-way bandwidth requirements of three popular CODECs and a Mean Opinion Score (MOS) based on the ITU-T recommendation for measuring voice quality (higher MOS values indicate better quality).

TABLE 1

| CODEC | NOMINAL DATA RATE (one way only) kbps | MOS |
|---|---|---|
| G.711 | 64 | 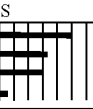 |
| G.729 | 8 | |
| G.723 v1 | 6.3 | |
| G.723 v2 | 5.3 | |

As illustrated in Table 1, CODECs such as G.723 and G.729 significantly reduce the data bandwidth required. There is, however a general tradeoff, between using a high compression CODEC (with its low bandwidth usage) and voice quality. The high compression CODECs typically have slightly reduced voice quality (as reflected in the MOS rating), and introduce additional delay due to the added computational effort. The highest bandwidth is required by the minimal compression G.711 CODEC, which is the standard toll quality CODEC.

Another factor in bandwidth usage is the overhead introduced by different IP layers. Most CODECs operate by collecting a block of voice samples and then compressing this block to produce a frame of coded voice. As this media frame is prepared for transport over IP, different protocol layers add their own headers to the data to be able to recreate the voice stream at the destination. FIG. 1 illustrates how an IP datagram carrying a single G.723.1 version-1 frame might like on a dial-up line.

Protocol overhead can be reduced by including more than one media frame per datagram (or packet). This also reduces the number of packets sent per second and hence the bandwidth usage. FIG. 2 illustrates an example how the bandwidth usage is reduced when using 2, 3 and 4 frames per IP datagram using G.723.1 v1 CODEC. This improved efficiency comes at the cost of increased delay, but also has a positive side effect of improving jitter-tolerance. The effect of delay and jitter on voice quality is described below.

Delay along the voice transmission call path can significantly affect voice quality. If the delay is too large, for example greater than 400 ms (ITU-T recommendation), interactive communication will be impossible. Many factors contribute to delay in VoIP, the most important being the delay experienced by VoIP media packets on the network. Another source of delay is the CODEC used for processing voice. High compression CODECs introduce more delay than low compression CODECs.

VoIP media packets comprising a data stream may not experience the same delay. Some packets may be delayed more than others due to instantaneous network usage and congestion or as a result of traversing different routes through the network. This variance from the average delay is called jitter. Voice CODECS will produce poor voice output if the input packet stream is not delivered at the exact play-out time. A jitter buffer at the receiver can smooth out this variation but it adds some more delay. If the jitter is larger than what the buffer can handle, the jitter buffer may underflow or overflow resulting in packet loss.

QoS is also degraded by packet loss. The most common cause of packet loss on land-based networks is the overloading of a router queue along the transmission call path. In this case the router will discard packets. On land-based networks, packet loss is therefore a sign of network congestion. Packets can also be lost because of corruption. Internet routers are programmed to discard corrupted packets. Voice CODECS can generally cope with small random packet losses, by interpolating the lost data. Large packet loss ratio or burst packet loss can severely degrade voice quality. The exact limits vary by the CODEC used but generally, low compression CODECS are more tolerant to packet loss.

The lack of QoS guarantees on the Internet has been a major challenge in developing VoIP applications. IETF is working on a number of proposals to help guarantee the quality of service that time critical data such as VoIP services require, including:

Differentiated Service ("Diffserv") which instructs the network routers to route based on priority bits in the packet header.

Integrated Services and RSVP to set up end-to-end virtual channels that have reserved bandwidth similar to circuit-switched telephony Multi-protocol Label switching which users labels inserted into the packets to route traffic in an efficient way These services are, however, not currently available on the present day Internet. VoIP applications on end systems are required to work around the hurdles presented to regular and timely data flow. The Internet offers a best effort delivery service. So long as sufficient bandwidth is available, VoIP traffic can flow smoothly with an acceptable QoS. If the bandwidth is constrained, the effects described above will result in degraded voice quality.

What would be desirable are means to allow VoIP applications to sense the current call path bandwidth and to adapt in real-time the transmission rate to utilize that bandwidth.

SUMMARY

Embodiments of the present invention provide a real-time bandwidth monitor (RTBM) for VoIP applications to sense the available bandwidth between two endpoints of a VoIP communication (herein, a "call path") and to adapt in real-time the transmission rate to utilize that bandwidth. If sufficient bandwidth is available, the RTBM selects a low compression, low latency CODEC to offer best possible voice quality to the user. If the bandwidth is constrained, the RTBM, instead of allowing the VoIP application to fail, degrades gracefully by switching to a high compression CODEC. On further bandwidth reduction, the RTBM increases the media frames per packet. Because the bandwidth reduction may be transitory, the RTBM constantly monitors the end-to-end available bandwidth so as to invoke the CODEC/frame per packet combination that provides the best QoS achievable over the current end-to-end available bandwidth.

It is therefore an aspect of the present invention to monitor current end-to-end available bandwidth in a VoIP communication using a real-time bandwidth monitor (RTBM) and to adapt in real-time the transmission rate of a VoIP application to utilize that bandwidth.

It is another aspect of the present invention that if the RTBM determines that sufficient bandwidth is available, to select a low compression, low latency CODEC to offer the best possible voice quality to the user.

It is still another aspect of the present invention that if the RTBM determines that bandwidth is limited, to switch to a high compression CODEC.

It is yet another aspect of the present invention that if the RTBM determines that the bandwidth is highly restricted, to increase the media frames per packet.

It is an aspect of the present invention to constantly monitor the call path available bandwidth so as to invoke the CODEC/frame per packet combination that provides the best QoS achievable over the current call path available bandwidth.

It is another aspect of the present invention to determine improvements in bandwidth for VoIP media communications by making specialized measurements via "probe packets" sent prior to media startup and during conversation "silence periods" so that no additional network bandwidth is consumed for making the measurement.

It is still another aspect of the present invention to provide a RTBM that is application independent and able to adjust the send rate automatically in a plug and play fashion.

These and other aspects of the present invention will become apparent from a review of the general and detailed descriptions that follow.

An embodiment of the present invention provides a method for adapting the transmission rate of media packets between endpoints in a voice over Internet protocol (VoIP) communication. A starting bandwidth measure at a starting endpoint is determined. A starting CODEC at the starting endpoint is selected based on the starting bandwidth measure. The starting CODEC is associated with a starting CODEC nominal data rate. An ending bandwidth measure at the ending endpoint is determined. An ending CODEC at the ending endpoint is selected based on the ending bandwidth measure. The ending CODEC is associated with an ending CODEC nominal data rate. The ending endpoint is informed of the starting CODEC nominal data rate. The starting endpoint is informed of the ending CODEC nominal data rate. A current CODEC comprising a data rate equal to the lower of the starting CODEC nominal data rate and the ending CODEC nominal data rate is selected and used at the starting and ending end points.

In another embodiment of the present invention, the starting bandwidth measure is determined by sending a starting probe packet from the starting endpoint to a network device. According to embodiments of the present invention, the network device is selected from the group consisting of a STUN server, a SIP server, and an echo server. The starting probe packet is echoed by the network device to the starting endpoint. The bandwidth of the path from the starting endpoint to the network device is then determined.

The starting CODEC is associated with a bandwidth range. A determination is made whether the starting bandwidth measure is within the bandwidth range. If so, the starting CODEC is selected.

In another embodiment of the present invention, a packet loss ratio of a media packet stream between the starting endpoint and the ending endpoint is obtained. A determination is made whether the packet loss ratio exceeds a maximum packet loss ratio associated with the current CODEC. If the packet loss ratio exceeds the maximum packet loss ratio, then a nominal in-use data rate of the current CODEC is determined. A determination is made whether the current CODEC is associated with an alternate nominal data rate that is lower than the nominal in-use data rate. If current CODEC is associated with an alternate nominal data rate that is lower than the in-use data rate, the alternate nominal data rate is substituted for the in-use nominal data rate.

If the current CODEC is not associated with an alternate nominal data rate that is lower than the in-use nominal data rate, a determination is made whether a current frames per packet measure is less than a maximum frames per packet measure associated with the current CODEC. If the current frames per packet measure is less than the maximum frames per packet measure associated with the current CODEC, then the frames per packet measure of the media packet is increased.

If the current frames per packet measure is greater than or equal to the maximum frames per packet, then a determination is made whether a substitute CODEC having a substitute nominal data rate that is lower than the nominal data rate of the current CODEC is available at the starting and ending endpoints. If the substitute CODEC is available at the starting and ending endpoints, then the substitute CODEC is used at the starting and ending endpoints.

DETAILED DESCRIPTION

Embodiments of the present invention provide a real-time bandwidth monitor (RTBM) for VoIP applications to sense the available bandwidth between two endpoints of a VoIP communication (herein, a "call path") and to adapt in real-time the transmission rate to utilize that bandwidth. If sufficient bandwidth is available, the RTBM selects a low compression, low latency CODEC to offer best possible voice quality to the user. If the bandwidth is constrained, the RTBM, instead of allowing the VoIP application to fail, degrades gracefully by switching to a high compression CODEC. On further bandwidth reduction, the RTBM increases the media frames per packet. Because the bandwidth reduction may be transitory, the RTBM constantly monitors the end-to-end available bandwidth of the path so as to invoke the CODEC/frame per packet combination that provides the best QoS achievable over the current end-to-end available bandwidth.

Figure 1:
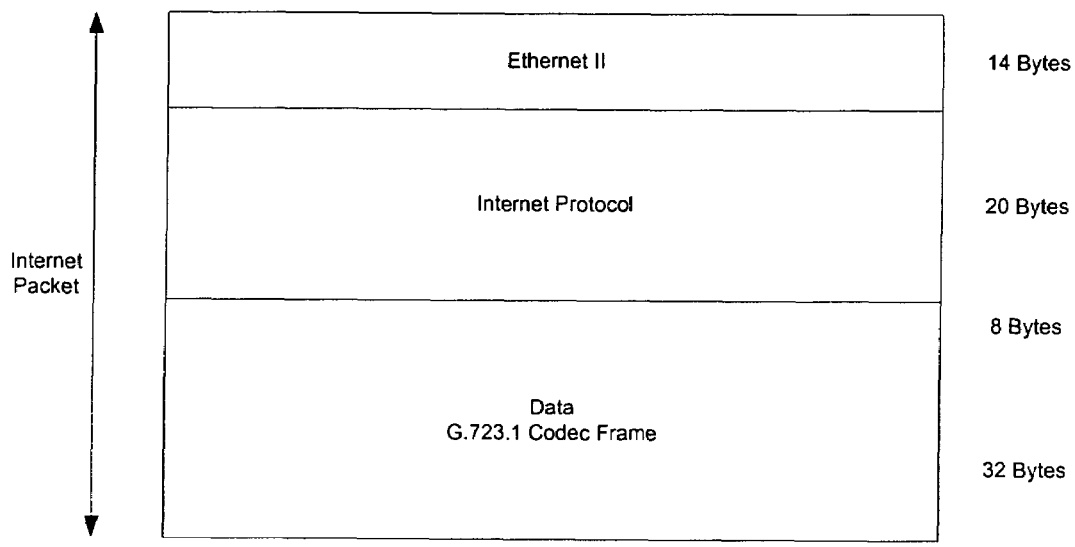
FIG. 1 illustrates how an IP datagram carrying a single G.723.1 version-1 frame might look on a dial-up line as known in the prior art.
Figure 2:
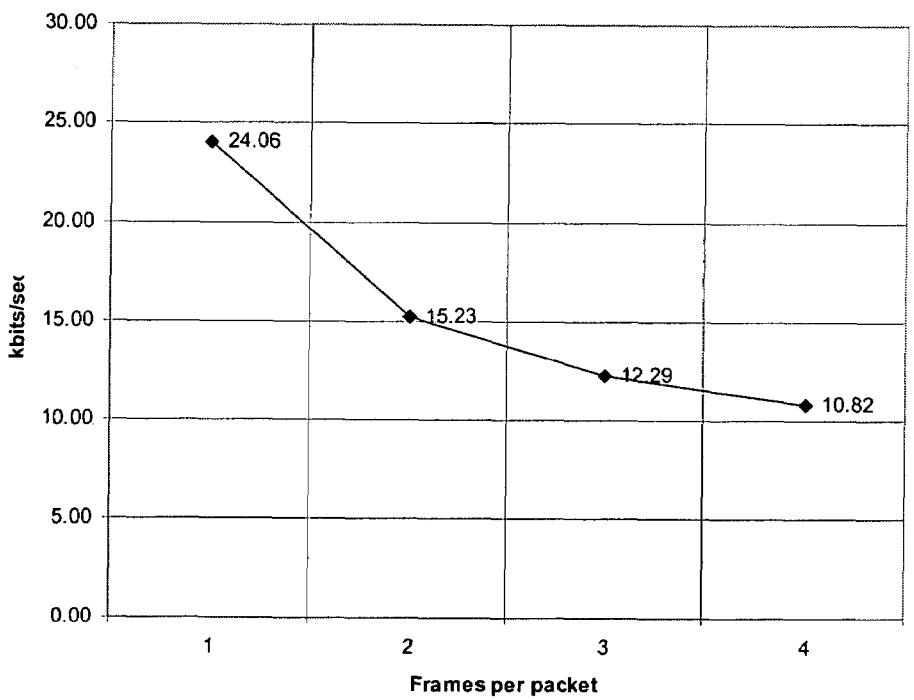
FIG. 2 illustrates an example of how the bandwidth usage is reduced when using 2, 3 and 4 frames per IP datagram using a G.723.1 v1 CODEC as is known in the prior art.
Figure 3:
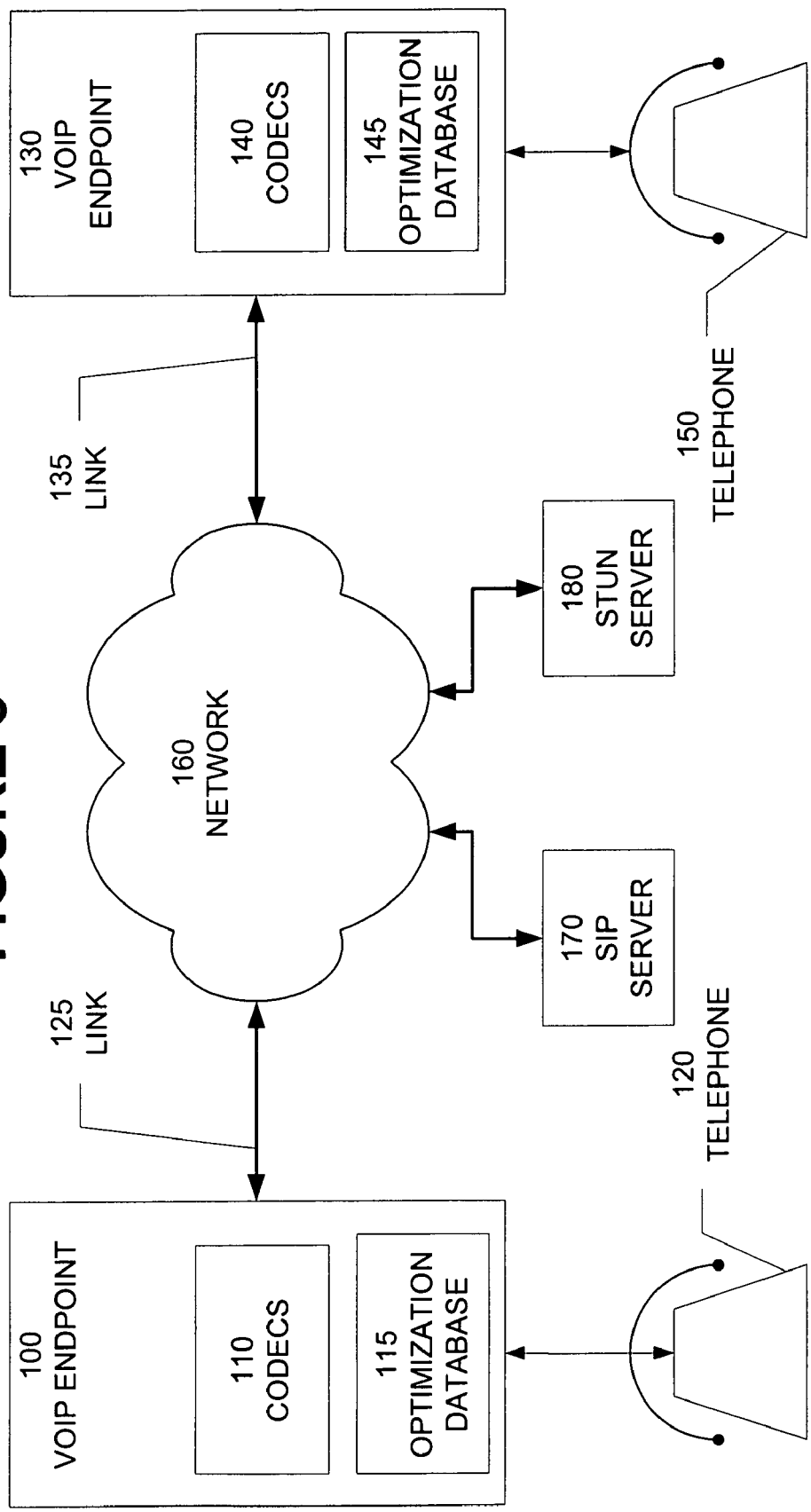
FIG. 3 illustrates a typical call path VoIP system according to embodiments of the present invention.

FIG. 3 illustrates a typical call path of a VoIP system according to embodiments of the present invention. Referring to FIG. 3, a VoIP endpoint 100 comprising one or more CODECs 110 is connected to a telephone 120. VoIP endpoint 100 is also connected to a network 160 via a link 125. A VoIP endpoint 130 comprising one or more CODECs 140 is connected to a telephone 150. VoIP endpoint 130 is also connected to a network 160 via a link 135. Network 160 is an IP network such as the Internet. Links 125 and 135 provide means for connecting the VoIP endpoint (100 and 130) to network 160, including dialup connections, DSL connections, and wireless connections. The VoIP endpoint (100 and 130) may also be located behind a LAN (not illustrated) in which case the connection to network 160 is made through a router (not illustrated). Typically, the VoIP endpoint (100 and 130) is a VoIP gateway. However, the present invention is not so limited. The VoIP endpoint (100 and 130) may be a computer, a VoIP-enabled telephone, or other device capable of performing the tasks associated with the VoIP endpoint.

When a call is placed from telephone 120 to telephone 150, the voice quality of the audio signal is affected by the CODEC used and the bandwidth of the network path between them. In an embodiment of the present invention, VoIP endpoint 100 and VoIP endpoint 130 each comprise an optimization database (115 and 145 respectively). Each entry in the database maps a range of bandwidth calculations to a set of pre-computed optimizations for CODEC and frames per packet.

In an embodiment of the present invention, optimization databases 115 and 145 list all usable CODEC and frames per packet combinations. For each CODEC and frame rate combination, optimization databases 115 and 145 further lists the minimum required bandwidth and the maximum tolerable packet loss ratio. The required bandwidth entries are pre-computed values. The maximum tolerable packet loss ratio is an experimentally determined quantity.

In order to establish a VoIP call, the endpoints will typically use a signaling protocol such as IETF's SIP or ITU-T's H323. If a calling endpoint knows the address of a destination endpoint, the calling endpoint sends a setup request directly to the destination endpoint. If the calling endpoint only knows an alias or "telephone number," the calling endpoint resolves the alias or telephone number into an IP address by using a directory service. Alternatively, the calling endpoint may forward the setup request to a proxy server that will perform the address resolution and forward the setup request to the destination end-point on behalf of the sender. Once the call setup negotiations are complete, the two endpoints exchange media using the RTP protocol, which provides all the necessary information to reassemble a media stream from packets. When the media session is in progress, each receiver uses RTCP to send feedback to the sender about the quality of the packet stream it is receiving.

In addition to these protocols VoIP devices may require to implement supplementary protocols to function properly. One such protocol is STUN that is used by an endpoint on a private LAN to determine an external routable IP address.

Figure 4:
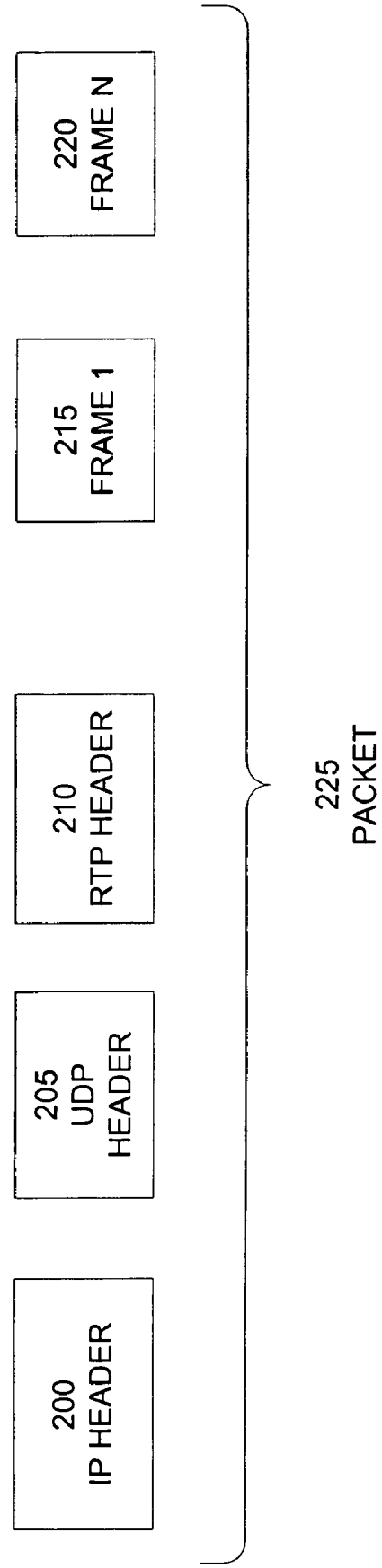
FIG. 4 illustrates the architecture of a typical voice packet as known in the prior art.

FIG. 4 illustrates the architecture of a typical voice packet. The coded voice is assembled into packets as it is being prepared for transport over a VoIP link. The TCP/IP protocol stack, using UDP (User Datagram Protocol) and RTP (Real Time Protocol) executes this process. Referring to FIG. 4, packet 225 comprises an IP 200, a UDP 205, and an RTP 210 header. Together, these headers utilize 40 bytes. These headers comprise protocol information needed to properly transport the data. Included in this protocol information is data such as the source and destination IP addresses, the IP port number, the packet sequence number, etc. An important consideration for an IP telephony network is whether one 215 or more frames 220 of coded media data follow the headers. Using the G.723.1 CODEC, each packet would have only 24 bytes of data to 40 bytes of header. Thus, the header would be 67% of the entire packet. Adding more frames of coded media will decrease the header to payload ratio but will also increase latency and sensitivity to packet losses.

In an exemplary embodiment, during the time when the calling endpoint has sent a call setup request and the called endpoint has not yet responded with the final acknowledgment, the endpoints measure the bandwidth of the actual media path by bouncing probe packets off each other. Prior to this measurement, the two endpoints exchange media channel information. Both SIP and H.323 provide mechanisms for achieving this. Additionally, the two end points start echo servers on the same port as they intend to receive media on. When the above two conditions are met, both endpoints "ping" the peer and measure the path RTT, which can be used to calculate the available bandwidth. This gives a more accurate measure of the path bandwidth and can be used to fine-tune the frames per packet for the media stream.

In another embodiment of the present invention, the bandwidth is measured using a fixed number of probe packets. By way of illustration and not as a limitation, in an exemplary embodiment of the present invention, five packets of different sizes are used to determine the bandwidth. The Round Trip Time (RTT) for each packet size is measured is measured twice and then the minimum of the two is used. Using linear regressions, the slope of the line that fits a plot of RTT samples against packet size is determined using the following formula:

$$m = (n*\text{sigma}XY - \text{sigma}X*\text{sigma}Y)/(n*\text{sigma}(X^2) - (\text{sigma}X)^2),$$

where Y=RTT, X=size of packet, n=number of samples, m=slope, and sigma is a summing function.

The slope m can be calculated as the samples are collected therefore there is no need to first collect all samples and then process them afterwards. The bandwidth is then calculated is as follows:

$$\text{bandwidth} = l/m$$

In this exemplary embodiment, when a call session is established, the calling VoIP endpoint presents its preferred CODEC to the called endpoint and the called endpoint presents its preferred CODEC to the calling endpoint. The CODEC associated with the lower nominal data rate is used by both endpoints for the media stream. For the most cases this is a good choice and the media path can easily provide the bandwidth required by the media stream.

RTP and RTCP protocols are used for the media exchange. The RTP protocol provides mechanisms for transporting the actual voice payload. The RTP header includes sequence number, timestamp and source identifier, this information is used to reconstruct the stream from the individual packets and to detect lost delayed or out of sequence packets. Each receiving endpoint collects information about the total number of lost packets and packet arrival jitter (variation in packet arrival times) and conveys this information back to the sending endpoint using RTCP protocol at regular intervals. The jitter buffer in each endpoint will smooth out jitter within a certain range and rearrange out of sequence packets. However, if a packet is delayed beyond the capability of the jitter buffer, it will be considered a lost packet. Similarly, a burst of packets that causes the jitter buffer to overflow will result in lost packets. According to the exemplary embodiment, each receiving end point also collects the number of packets lost due to jitter buffer overflow and underflow and passes this information to the sending endpoint through RTCP as jitter buffer packet loss.

The jitter packet loss provides a measure of network jitter and delay. Excessive packet loss is an indication of the fact that the media path is not able to support the bandwidth requirements of the media stream. If the packet loss ratio exceeds the acceptable packet loss ratio for the current CODEC configuration as established in the optimization databases (see, FIG. 3, 115 and 145) and if the conditions persists for a preset amount of time, an endpoint may take one of the following actions, preferably in the following order:

1. If the current CODEC is a variable bit rate CODEC such as G.723.1 and the current bit rate is not the lowest bit rate offered by the CODEC, then switch to lower bit rate encoding.
2. If the current frames per packet is less than the maximum frames per packet for the CODEC, the increase the frames per packet.
3. If the current frames per packet is equal to the maximum allowed frames per packet for the current CODEC and a lower bandwidth CODEC is available, negotiate using the lower bandwidth CODEC with the other endpoint.

In still another embodiment of the present invention, if action 1 or 2 above has been taken, the bandwidth is periodically measured during silence intervals to determine if the conditions are again suitable for restoring the previous CODEC configuration.

Systems and methods for dynamically adapting the transmission rate for real-time voice over IP communications to the available bandwidth have been disclosed. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Additionally, as will be appreciated by those skilled in the art, references to specific network protocols are illustrative and not limiting. Further, any reference to claim elements in the singular, for example, using the articles "a," "an," or "the" is not to be construed as limiting the element to the singular.

What is claimed is:

1. A method for adapting the transmission rate of media packets between endpoints in a voice over Internet protocol (VoIP) communication comprising:
    determining a starting bandwidth measure at a starting endpoint;
    selecting a staffing CODEC at the starting endpoint based on the starting bandwidth measure, wherein the starting CODEC is associated with a staffing CODEC nominal data rate; determining an ending bandwidth measure at an ending endpoint;
    selecting an ending CODEC at the ending endpoint based on the ending bandwidth measure, wherein the ending CODEC is associated with an ending CODEC nominal data rate; informing the ending endpoint of the starting CODEC nominal data rate; informing the starting endpoint of the ending CODEC nominal data rate; selecting a current CODEC comprising a data rate equal to the lower of the starting CODEC nominal data rate and the ending CODEC nominal data rate;
    using the current CODEC at the starting and ending end points;
    obtaining a packet loss ratio of a media packet stream between the starting endpoint and the ending endpoint;
    determining whether the packet loss ratio exceeds a maximum packet loss ratio associated with the current CODEC;
    when the packet loss ratio exceeds the maximum packet loss ratio, determining a nominal in-use data rate of the current CODEC;
    determining whether the current CODEC is associated with an alternate nominal data rate that is lower than the nominal in-use data rate;
    when the current CODEC is associated with the alternate nominal data rate that is lower than the nominal in-use data rate, substituting the alternate nominal data rate for the nominal in-use data rate;
    when the current CODEC is not associated with the alternate nominal data rate that is lower than the in-use nominal data rate, determining whether a current frames per packet measure is less than a maximum frames per packet measure associated with the current CODEC;
    when the current frames per packet measure is less than the maximum frames per packet measure associated with the current CODEC, increasing the frames per packet measure of the media packet stream;
    when the current frames per packet measure is greater than or equal to the maximum frames per packet measure, determining whether a substitute CODEC having a substitute nominal data rate that is lower than the in-use nominal data rate is available at the starting and ending endpoints; and
    when the substitute CODEC is available at the staffing and ending endpoints, using the substitute CODEC at the staffing and ending endpoints.

2. The method for adapting the transmission rate of media packets between endpoints in a VoIP communication of claim 1, wherein determining the staffing bandwidth measure comprises:

sending a staffing probe packet from the staffing endpoint to a network device; echoing the staffing probe packet from the network device to the staffing endpoint; and determining the bandwidth of the path from the staffing endpoint to the network device.

3. The method for adapting the transmission rate of media packets between endpoints in a VoIP communication of claim 2, wherein the network device is selected from a STUN server, a SIP server, an endpoint, and an echo server.

4. The method for adapting the transmission rate of media packets between endpoints in a VoIP communication of claim 1, wherein selecting the starting CODEC at the staffing endpoint comprises:

associating the starting CODEC with a bandwidth range; determining whether the staffing bandwidth measure is within the bandwidth range; and if the staffing bandwidth measure is within the bandwidth range, then selecting the starting CODEC.

* * * * *

UNITED STATES PATENT AND TRADEMARK OFFICE
CERTIFICATE OF CORRECTION

PATENT NO. : 7,460,480 B2
APPLICATION NO. : 11/078059
DATED : December 2, 2008
INVENTOR(S) : Ali Awais It is certified that error appears in the above-identified patent and that said Letters Patent is hereby corrected as shown below:

Column 8, line 61 and line 63, "staffing" should be changed to --starting--.

Column 10, line 6 and line 7, "staffing" should be changed to --starting--.

Signed and Sealed this

Tenth Day of February, 2009

JOHN DOLL
*Acting Director of the United States Patent and Trademark Office*